United States Patent
Karafillis et al.

(10) Patent No.: US 6,349,467 B1
(45) Date of Patent: Feb. 26, 2002

(54) PROCESS FOR MANUFACTURING DEFLECTOR PLATE FOR GAS TURBIN ENGINE COMBUSTORS

(75) Inventors: Apostolos P. Karafillis, Cambridge; Ronald D. Regan, Beverly, both of MA (US); Kena K. Yokoyama, Latham, NY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/388,234

(22) Filed: Sep. 1, 1999

(51) Int. Cl.⁷ .................................................. B23P 15/00
(52) U.S. Cl. ................................. 29/890.01; 29/889.721
(58) Field of Search ........................ 29/889.74, 890.01, 29/888.01; 60/752

(56) References Cited

U.S. PATENT DOCUMENTS

| | | | | |
|---|---|---|---|---|
| 2,654,219 A | * | 10/1953 | Zaba | 60/752 |
| 4,688,310 A | * | 8/1987 | Kelm et al. | 29/890.01 |
| 5,363,643 A | * | 11/1994 | Halila | 60/752 |
| 5,784,876 A | * | 7/1998 | Alkabie | 60/752 |
| 5,924,288 A | * | 7/1999 | Fortuna et al. | 60/752 |
| 5,974,805 A | * | 11/1999 | Allen | 60/752 |
| 6,021,570 A | * | 2/2000 | Lockyer et al. | 29/890.01 |

* cited by examiner

Primary Examiner—I Cuda Rosenbaum
(74) Attorney, Agent, or Firm—Andrew C. Hess; V. Ramaswamy

(57) ABSTRACT

A process for manufacturing components of gas turbine engine combustors, including the steps of performing a plurality of forming steps on a workpiece of a designated material to produce a combustor component of desired size and shape without exceeding a forming limit of the designated material, the forming steps being performed without any intermediate heat treatment on the workpiece.

15 Claims, 3 Drawing Sheets

PROCESS FOR MANUFACTURING DEFLECTOR PLATE FOR GAS TURBINE ENGINE COMBUSTORS

BACKGROUND OF THE INVENTION

The present invention relates generally to a deflector plate in a gas turbine engine combustor and, in particular, to a process for manufacturing such deflector plates which does not include heat treatment of the workpiece between forming steps.

It is well known in the art for deflectors of gas turbine engine combustors to be manufactured by forming and trimming sheet metal material to a desired final part. During these forming processes, however, the workpiece deflector can exhibit excessive thinning or tearing. In order to avoid this defect, heat treatments or annealing steps have been performed between and after such forming steps. This is particularly applicable for parts manufactured out of Haynes® 188, a commonly used sheet metal material for gas turbine engine combustors due to its exposure to high temperatures.

Heat treatment of the deflector workpiece is not without its own disadvantages. Besides the time and expense of performing the heat treatment, typically by means of vacuum furnace equipment, it has been found to cause critical grain growth in the workpiece. Additionally, such heat treatment can cause the creation of a surface oxide layer which is detrimental to the subsequent brazing of such deflector to other combustor components. Thus, chemical treatment for removal of the oxide layer is oftentimes required prior to the brazing process.

In light of the foregoing, it would be desirable for an improved process of manufacturing combustor deflector plates to be developed which eliminates the need for heat treatment between forming steps without the workpiece incurring excessive thinning or cracking. It would also be desirable for such process to produce combustor deflector plates which have a finer grain size and more uniform structure, while still reducing the time and cost required as compared to current methods.

BRIEF SUMMARY OF THE INVENTION

In an exemplary embodiment of the invention, a process for manufacturing components of gas turbine engine combustors is disclosed as performing a plurality of forming steps on a workpiece of a designated material to produce a combustor component of desired size and shape without exceeding a forming limit of the designated material, the forming steps being performed without any intermediate heat treatment on the workpiece.

In a second embodiment of the present invention, a deflector plate for a gas turbine engine combustor is disclosed as including a substantially ring-shaped central portion providing an opening through the deflector plate, a flange portion encircling the central portion, and a shoulder portion serving as a junction of the central and flange portions, wherein heat treatment of the deflector plate has been eliminated during forming so as to obtain a grain size along said central portion within a range of approximately ASTM 7.5–9.5 after a braze material is sintered thereto.

In a third embodiment of the present invention, a method of developing a sequence of steps for a process of manufacturing a gas turbine engine combustor component is disclosed, wherein heat treatment between forming steps of a workpiece is eliminated. This method includes the following steps: developing a finite element analysis model of the manufacturing process, wherein deformation and thinning of the workpiece are represented during the forming steps; creating a user interface for entering a plurality of parameters associated with the manufacturing process; automatically creating a finite element analysis input file from the user interface parameters; determining the likelihood of a tearing defect occurring for the workpiece during the manufacturing process from each input file; and, establishing a sequence of forming steps for the manufacturing process which produce a combustor component conforming to a predetermined shape and size within a predetermined risk of tearing defects.

DETAILED DESCRIPTION OF THE INVENTION

Figure 1:
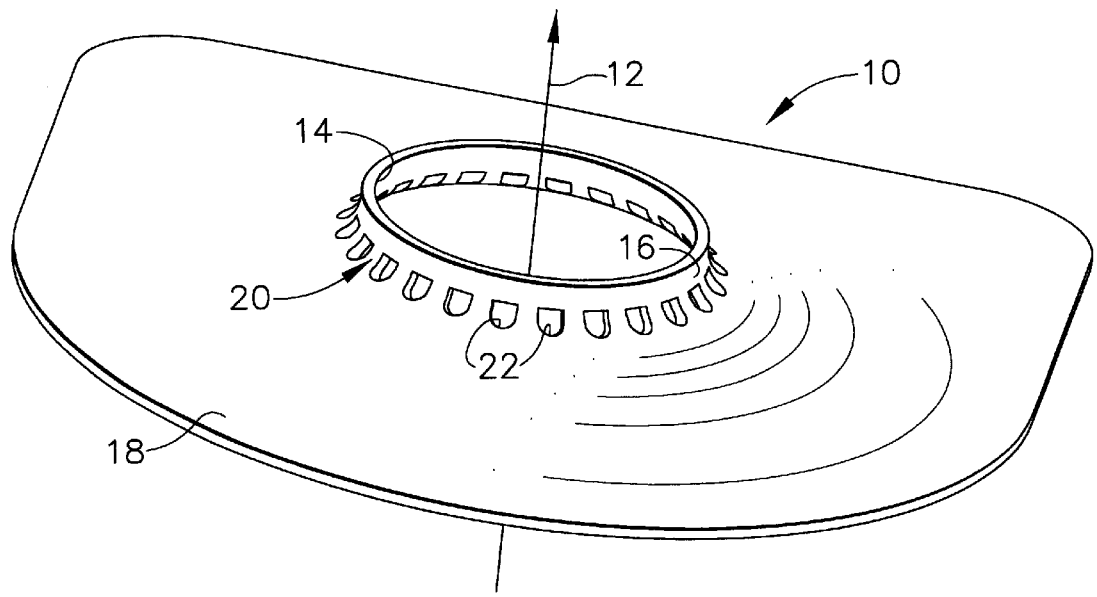
FIG. 1 is a perspective view of a deflector plate made in accordance with the process of the present invention.
Figure 2:
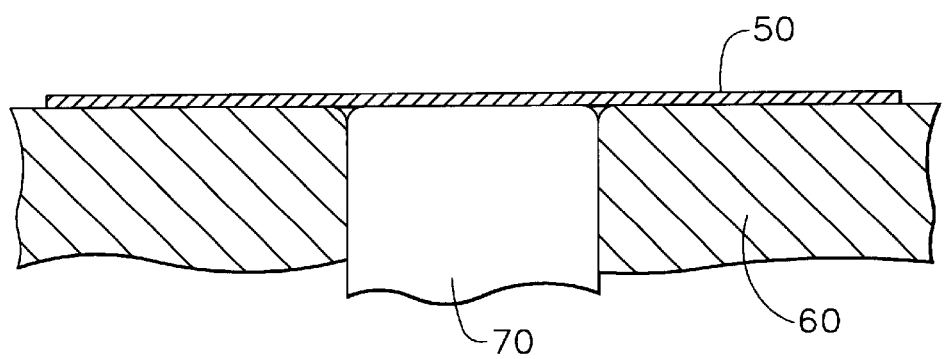
FIG. 2 is a schematic cross-sectional view of an initial state of a workpiece subject to the process of the present invention.

Referring now to the drawings in detail, wherein identical numerals indicate the same elements throughout the figures, FIG. 1 depicts a deflector plate utilized in gas turbine engine combustors as being represented generally by reference numeral 10. It will be seen therefrom that deflector plate 10 is of substantially symmetrical design and includes a longitudinal axis 12 passing therethrough. More specifically, deflector plate 10 has a central opening 14 formed therein by a substantially ring-shaped annular wall 16, a flange portion 18 which is angled away from and encircles annular wall 16, and a shoulder region 20 connecting annular wall 16 and flange portion 18 having a desired radius R. Further, a plurality of cooling holes 22 are formed within shoulder region 20.

It will be appreciated that the present invention involves a novel process for manufacturing deflector plate 10 which may also be applied to other gas turbine engine combustor components exposed to high temperatures and made of a sheet metal material. The various steps of the process are depicted in FIGS. 2–7 and are now described in greater detail. Initially, a workpiece 50 is shown as a flat blank of material held next to a die 60 by hydraulic pressure so as to be adjacent a punch 70 (see FIG. 2). Workpiece 50 is formed (preferably by hydroforming) into an axisymmetric shape (see FIG. 3) of desired size and shape, where workpiece 50 includes a substantially cylindrical central portion 52 punched therein having an initial diameter $D_1$, a substantially flat flange portion 54 encircling central portion 52, and a transition region 56 between central portion 52 and flange portion 54. It will be noted that transition region 56 is initially formed with a radius $R_1$ therein. Punch 70 also has a nose radius $N_1$ located at each corner thereof in order to lessen the stress imposed on workpiece 50.

Figure 3:
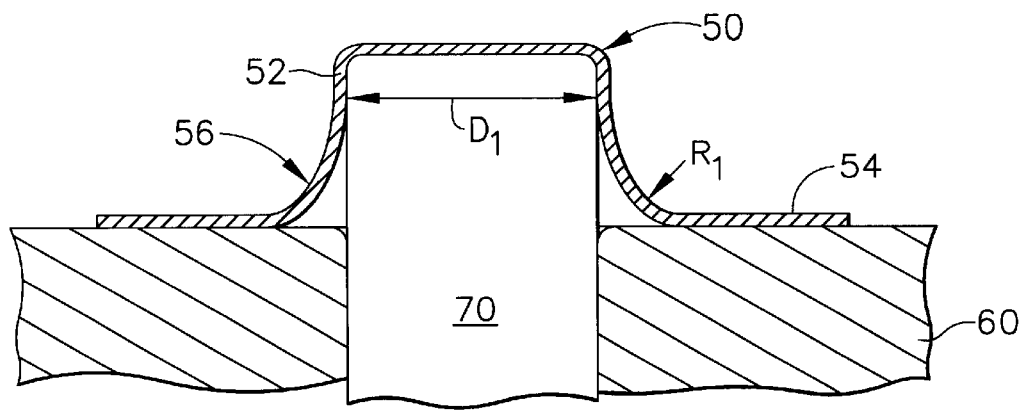
FIG. 3 is a schematic cross-sectional view of a first forming step on the workpiece of FIG. 2 according to the process of the present invention.

Although not depicted in FIG. 3, it is preferred that the aforementioned hydroforming step be accomplished in multiple stages. More specifically, a first punch motion is provided by punch 70 for a first predetermined displacement while workpiece 50 is under a first predetermined pressure. Thereafter, at least a second punch motion is performed by punch 70 for a second predetermined displacement while workpiece 50 is under a second predetermined pressure.

Figure 4:
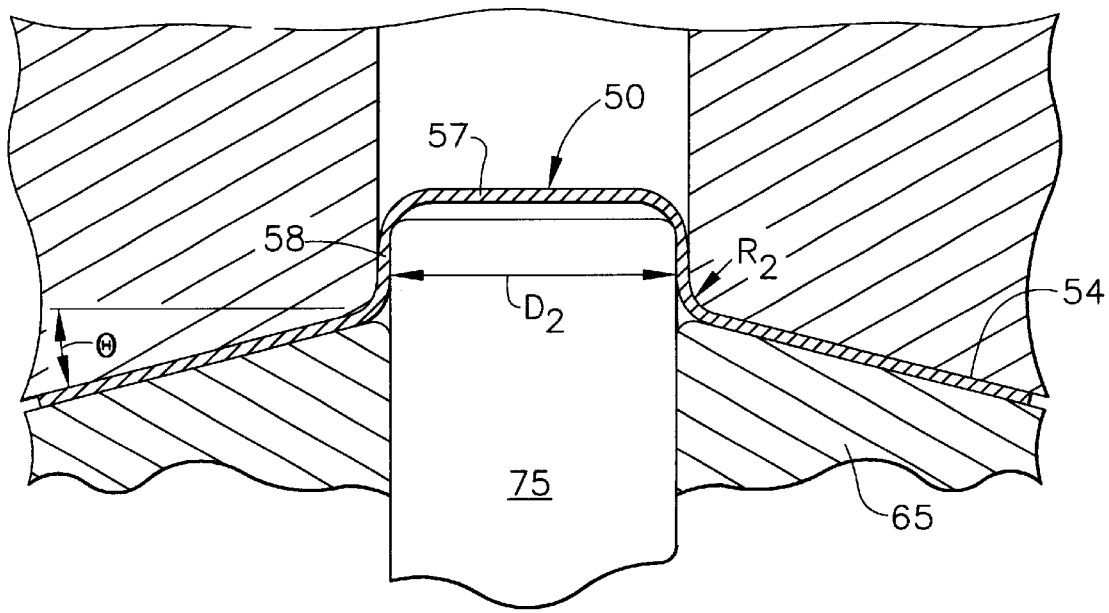
FIG. 4 is a schematic cross-sectional view of a second forming step on the workpiece of FIG. 3 according to the process of the present invention.

Next, as depicted in FIG. 4, workpiece 50 is held against a second die 65 so that a second punch 75 (having a nose radius $N_2$ at each corner) is able to form modifications thereto. In this step, central portion 52 is given a larger diameter $D_2$ by punch 75, flange portion 54 is bent so as to be angled further away from central portion 52 (identified by an angle θ), and transition region 56 has a smaller radius $R_2$ in accordance with die 65. It will be appreciated that conventional manufacturing processes require some kind of heat treatment for workpiece 50 between the forming steps described with respect to FIGS. 3 and 4, but none is required by the process of the present invention.

Figure 5:
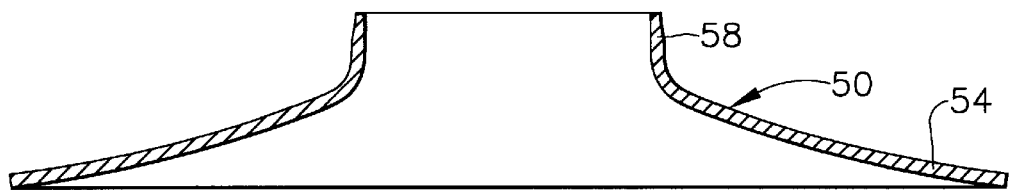
FIG. 5 is a schematic cross-sectional view of the workpiece of FIG. 4 after a piercing step according to the process of the present invention has been performed.
Figure 6:
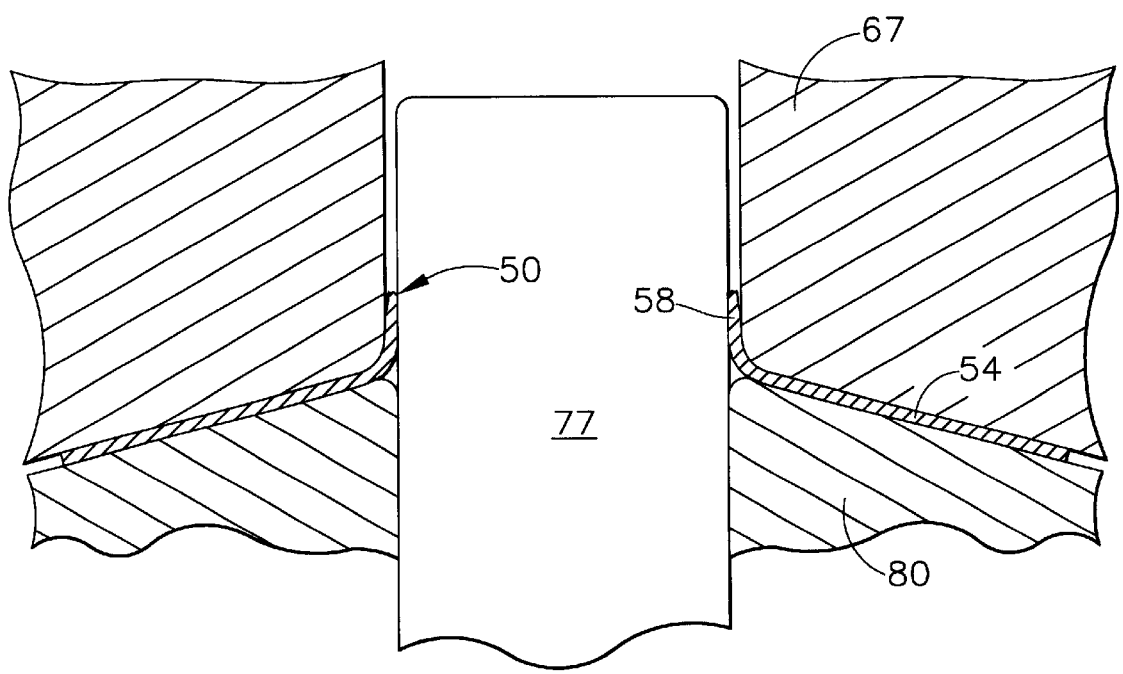
FIG. 6 is a schematic cross-sectional view of a final forming step on the workpiece of FIG. 5 according to the process of the present invention; and, FIG. 7 is a schematic cross-sectional view of a final trimming step on the workpiece of FIG. 6 according to the process of the present invention.
Figure 7:
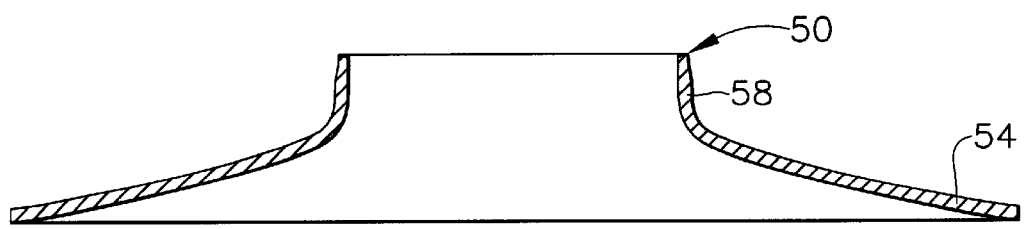

According to FIG. 5, workpiece 50 undergoes a piercing operation where a substantially circular end 57 of central cylindrical portion 52 is removed so as to provide central opening 14 described hereinabove for deflector plate 10. At this point, central portion 52 becomes a substantially ring-shaped annular wall 58. Workpiece 50 is preferably then subjected to a final forming step (see FIG. 6) by a die 67 and a punch 77 to place it in accordance with the final dimensions for deflector plate 10. It will also be seen that a blankholder 80 is utilized to hold workpiece 50 against die 67 and prevent workpiece 50 from drawing in toward punch 77. More specifically, this forming step preferably involves increasing the diameter of annular wall 58 of central portion 52 via punch 77, straightening annular wall 58 by means of die 67 so as to be substantially vertical, and modifying radius $R_2$ of transition region 56 as necessary. The final step in forming workpiece 50 involves trimming a top portion of annular wall 58 which has been thinned from the previous steps so that the dimensional requirements of deflector plate 10 are met.

Once the foregoing steps have been performed, it will be appreciated that workpiece 50 will typically undergo several other operations to transform it into deflector plate 10 as described above. In particular, a plurality of spaced cooling holes (identified by the numeral 22 in FIG. 1) are provided along the radiused portion of transition region 56, the outline of flange portion 54 is trimmed, and a brazing process is performed thereon. With respect to the brazing process, this is typically accomplished by attaching a brazing material tape to workpiece 50 along an inner diameter $D_2$ of annular wall 58 (where as a deflector plate 10 it will be connected to the remainder of a gas turbine engine combustor structure). The brazing tape preferably consists of braze material spherical particles in an aggregate with an organic bonding material. After the brazing tape is attached, a vacuum heat treatment process follows where workpiece 50 is soaked at a temperature of 2025° F. for approximately five minutes, and thereafter vacuum and air cooled. In this way, the material of the brazing tape is sintered to workpiece 50. Of course, it will be understood that workpiece 50 (as deflector plate 10) is heat treated again in order to create a brazing joint when connected to the combustor structure (preferably at 2140° F. for approximately five minutes).

By eliminating the heat treatment operations on workpiece 50 during the forming steps, it has been found that besides reducing the time and expense of the manufacturing process, the deflector plates manufactured therefrom are of a higher quality when compared to those produced by conventional methods. In this regard, the microstructure of deflector plates made according to the inventive process described herein exhibits a fine grain size (ASTM 7.5–9.5) and is relatively uniform after the sintering process. This stems from workpiece 50 being subjected to temperatures during the forming steps which are less than those during the sintering step. Even after the final heat treatment cycle when workpiece 50 is brazed to a combustor, the microstructure thereof was found to be in the range of ASTM 6.5–8.5 for the present process as opposed to ASTM 1–8 for conventional methods. It will be appreciated that the finer grain size of the deflector plates produced by the present process is desirable due to its inherent characteristics of increased strength and intergranular crack growth resistance.

It will be appreciated that various processes exist for designing a manufacturing process, including that disclosed in a patent application entitled "Method And Apparatus For Designing A Manufacturing Process For Sheet Metal Parts," having Ser. No. 09/017,343, filed Feb. 2, 1998, which is owned by the assignee of the present invention and hereby incorporated by reference. In order to design the steps of the present process of manufacturing a deflector plate without intermediate heat treatment steps, a simplified axisymmetric finite element analysis model of the process was developed. While a three-dimensional method could be utilized for the finite element analysis, it was found to be time consuming. Accordingly, the simplified model uses an 8-node reduced integration continuum element which was capable of representing deformation and thinning of workpiece 50 during successive forming steps.

A spreadsheet (based on the Excel® software program from Microsoft) was also created for the generation of input files to be used in the finite element analysis. This spreadsheet contains a user interface where all the geometry parameters of the forming tools (i.e., dies 60, 65 and 67 and punches 70, 75 and 77), as well as other process parameters, are entered so as to automatically create a finite element analysis input file. More specifically, the parameters entered into the spreadsheet include: stock thickness (inches) of the initial blank of material; blank diameter (inches) of workpiece 50; diameter (inches) of hydroform punch 70; nose radius $N_1$ (inches) of hydroform punch 70; first pressure (psi) of hydroform during a first punch motion; displacement (inches) of hydroform punch 70 during the first punch motion; second pressure (psi) of hydroform punch 70 during a second punch; displacement (inches) of hydroform punch 70 during the second punch; height of punch 75 (inches); nose radius $N_2$ (inches) of punch 75; radius $R_1$ of transition region 56 (inches), otherwise known as the draw radius for die 65; diameter $D_2$ (inches) of die 65; angle θ (degrees) of die 65; gap (inches) between punch 75 and die 65 (approximately the thickness of workpiece 50); number of elements to trim from center portion 52; height (inches) of punch 75; nose radius N (inches) of punch 77; radius $R_2$ of transition region 56 (inches), otherwise known as the draw radius of die 67; diameter (inches) of die 67; angle (degrees) of die 67; gap (inches) between punch 77 and die 67; pressure (psi) of blankholder 80; and, number of elements to trim from flange portion 54.

It will be appreciated that a program utilizing the Visual Basic programming language was used to create the finite element analysis input deck (an exemplary listing for such program is appended hereto). This program is used in conjunction with the spreadsheet user interface for the generation of an ABAQUS input file used in the simulations by the finite element analysis program.

The combination of the simplified finite element analysis model and the spreadsheet can be used on a trial and error basis or as part of a Design Of Experiments (DOE) process to develop the forming process sequence that produces a deflector plate (or other sheet metal part) free of tearing defects. The likelihood of a tearing defect occurrence can then be obtained by comparing the membrane strains of workpiece 50 (i.e., strains at the middle of the blank thickness) with a Forming Limit Diagram of the material. Thus, it will be appreciated that while this combination was used to design the manufacturing process of deflector plate 10 discussed herein, it may be applied to other sheet metal parts of gas turbine engine combustors in a similar manner.

Having shown and described the preferred embodiment of the present invention, further adaptations of the combustor deflector plate and the process for manufacturing it can be accomplished by appropriate modifications by one of ordinary skill in the art without departing from the scope of the invention.

APPENDIX A

Visual Basic program used in conjunction with the Excel front end spreadsheet for the generation of an ABAQUS input file

```
Option Explicit
Public Sub check( )
Dim Ws_in, Ws_calc, Ws_out As Worksheet
Dim i, marker As integer
Dim fileSaveName As Variant
Dim fileOrigName As Variant
Dim save_it As Variant
Dim outSheetNew As Variant
Set Ws_in = Worksheets("input")
Set Ws_calc = Worksheets("input")
Set Ws_out = Worksheets("deflector")
fileOrigName = ActiveWorkbook.FullName
marker = 0
'get geometry for first form
Sheets("input").Select
Ws_calc.Cells(2, "Q").Value = "First Form"
Ws_calc.Cells(3, "T").Value = "variables"
Ws_calc.Cells(4, "T").Value = "H1"
Ws_calc.Cells(5, "T").Value = "L1"
Ws_calc.Cells(6, "T").Value = "H3"
Ws_calc.Cells(7, "T").Value = "L3"
Ws_calc.Cells(8, "T").Value = "Theta3"
Ws_calc.Cells(9, "T").Value = "H"
Ws_calc.Cells(11, "T").Value = "constants"
Ws_calc.Cells(12, "T").Value = "L"
Ws_calc.Cells(13, "T").Value = "R"
Ws_calc.Cells(14, "T").Value = "Theta1"
Ws_calc.Cells(15, "T").Value = "H2"
Ws_calc.Cells(4, "U").Value = 1
Ws_calc.Cells(5, "U").Value = 1
Ws_calc.Cells(6, "U").Value = 1
Ws_calc.Cells(7, "U").Value = 1
Ws_calc.Cells(8, "U").Value = 1
Ws_calc.Cells(9, "U").Value = 1
Ws_calc.Cells(12, "U").Value = "= J5/2 – T33"
Ws_calc.Cells(13, "U").Value = "= J16"
Ws_calc.Cells(14, "U").Value = "= J18"
Ws_calc.Cells(15, "U").Value = 2.5
Ws_calc.Cells(4, "Q").Value = "tan(Theta1) = H1/L1"
Ws_calc.Cells(5, "Q").Value = "= TAN(U14*PI( )/180)"
Ws_calc.Cells(5, "R").Value = "= U4/U5"
Ws_calc.Cells(6, "Q").Value = "Theta1 + Theta3 = 90"
Ws_calc.Cells(7, "Q").Value = "= U14 + U8"
Ws_calc.Cells(7, "R").Value = "= 90"
Ws_calc.Cells(8, "Q").Value = "H3 = R*Sin(Theta3)"
Ws_calc.Cells(9, "Q").Value = "= U6"
Ws_calc.Cells(9, "R").Value = "= U13*SIN(U8*PI( )/180)"
Ws_calc.Cells(10, "Q").Value = "L3 = R*Cos(Theta3)"
Ws_calc.Cells(11, "Q").Value = "= U7"
Ws_calc.Cells(11, "R").Value = "= U13*COS(U8*PI( )/180)"
Ws_calc.Cells(12, "Q").Value = "L = R – L3 + L1"
Ws_calc.Cells(13, "Q").Value = "= U12"
Ws_calc.Cells(13, "R").Value = "= U13 – U7 + U5"
Ws_calc.Cells(14, "Q").Value = "H = H1 + H3"
Ws_calc.Cells(15, "Q").Value = "= U9"
Ws_calc.Cells(14, "R").Value = "= U4 + U6"
'punch movement
Ws_calc.Cells(3, "X").Value = "Punch movement stuff"
Ws_calc.Cells(4, "X").Value = "gap^2+d^2=f^2"
Ws_calc.Cells(5, "X").Value = "=AB12^2+AB4^2"
```

APPENDIX A-continued

Visual Basic program used in conjunction with the Excel front end spreadsheet for the generation of an ABAQUS input file

```
Ws_calc.Cells(5, "Y").Value = "= AB5^2"
Ws_calc.Cells(6, "X").Value = "f=t/cos(phi1)"
Ws_calc.Cells(7, "X").Value = "=AB5"
Ws_calc.Cells(7, "Y").Value = "=AB13/COS(AB6*PI( )/180)"
Ws_calc.Cells(8, "X").Value = "tan(phi2)=d/gap"
Ws_calc.Cells(9, "X").Value = "=TAN(AB7*PI( )/180)"
Ws_calc.Cells(9, "Y").Value = "=AB4/AB12"
Ws_calc.Cells(10, "X").Value = "90=theta+phi1+phi2"
Ws_calc.Cells(11, "X").Value = "90"
Ws_calc.Cells(11, "Y").Value = "=AB14+AB6+AB7"
Ws_calc.Cells(4, "AB").Value = "1"
Ws_calc.Cells(5, "AB").Value = "1"
Ws_calc.Cells(6, "AB").Value = "1"
Ws_calc.Cells(7, "AB").Value = "1"
Ws_calc.Cells(12, "AB").Value = "=J19"
Ws_calc.Cells(13, "AB").Value = "=J4"
Ws_calc.Cells(14, "AB").Value = "=J18"
'under tools —> references, make sure solver.xla is checked
Solverreset
SolverOptions precision:=0.001
SolverOK setcell:=Range("Q7"), _
    maxminval:=3, _
    valueof:=90, _
    bychange:=Range("U4:U9")
Solveradd cellref:=Range("R5"), _
    relation:=2, _
    formulatext:=Range("Q5")
Solveradd cellref:=Range("R9"), _
    relation:=2, _
    formulatext:=Range("Q9")
Solveradd cellref:=Range("R11"), _
    relation:=2, _
    formulatext:=Range("Q11")
Solveradd cellref:=Range("R13"), _
    relation:=2, _
    formulatext:=Range("Q13")
Solveradd cellref:=Range("R15"), _
    relation:=2, _
    formulatext:=Range("Q15")
Solveradd cellref:=Range("U4:U9"), _
    relation:=3, _
    formulatext:=0
Solversolve 'userFinish:=True
Solverreset
SolverOptions precison:=0.001
SolverOK setcell:=Range("Y11"), _
    maxminval:=3, _
    valueof:=90, _
    bychange:=Range("AB4:AB7")
Solveradd cellref:=Range("X5"), _
    relation:=2, _
    formulatext:=Range("Y5")
Solveradd cellref:=Range("X7"), _
    relation:=2, _
    formulatext:=Range("Y7"), _
Solveradd cellref:=Range("X9"), _
    relation:=2, _
    formulatext:=Range("Y9")
Sovlersolve 'userFinish:=True
Ws_calc.Cells(18, "Q").Value = "Final Form"
Ws_calc.Cells(19, "T").Value = "variables"
Ws_calc.Cells(20, "T").Value = "H1"
Ws_calc.Cells(21, "T").Value = "L1"
Ws_calc.Cells(22, "T").Value = "H3"
Ws_calc.Cells(23, "T").Value = "L3"
Ws_calc.Cells(24, "T").Value = "Theta3"
Ws_calc.Cells(25, "T").Value = "H"
Ws_calc.Cells(27, "T").Value = "constants"
Ws_calc.Cells(28, "T").Value = "L"
Ws_calc.Cells(29, "T").Value = "R"
Ws_calc.Cells(30, "T").Value = "Theta1"
Ws_calc.Cells(31, "T").Value = "H2"
Ws_calc.Cells(20, "U").Value = 1
Ws_calc.Cells(21, "U").Value = 1
Ws_calc.Cells(22, "U").Value = 1
Ws_calc.Cells(23, "U").Value = 1
```

APPENDIX A-continued

Visual Basic program used in conjunction with the Excel front end spreadsheet for the generation of an ABAQUS input file

```
Ws_calc.Cells(24, "U").Value = 1
Ws_calc.Cells(25, "U").Value = 1
Ws_calc.Cells(28, "U").Value = "= J5/2 − T35"
Ws_calc.Cells(29, "U").Value = "= J23"
Ws_calc.Cells(30, "U").Value = "= J25"
Ws_calc.Cells(31, "U").Value = 2.5
Ws_calc.Cells(20, "Q").Value = "tan(Theta1) = H1/L1"
Ws_calc.Cells(21, "Q").Value = "= TAN(U30*PI( )/180)"
Ws_calc.Cells(21, "R").Value = "= U20/U21"
Ws_calc.Cells(22, "Q").Value = "Theta1 + Theta3 = 90"
Ws_calc.Cells(23, "Q").Value = "= U30 + U24"
Ws_calc.Cells(23, "R").Value = "= 90"
Ws_calc.Cells(24, "Q").Value = "H3 = R*Sin(Theta3)"
Ws_calc.Cells(25, "Q").Value = "= U22"
Ws_calc.Cells(25, "R").Value = "= U29*SIN(U24*PI( )/180)*
Ws_calc.Cells(26, "Q").Value = "L3 = R*Cos(Theta3)"
Ws_calc.Cells(27, "Q").Value = "= U23"
Ws_calc.Cells(27, "R").Value = "= U29*COS(U24*PI( )/180)"
Ws_calc.Cells(28, "Q").Value = "L = R − L3 + L1"
Ws_calc.Cells(29, "Q").Value = "= U28"
Ws_calc.Cells(29, "R").Value = "= U29 − U23 + U21"
Ws_calc.Cells(30, "Q").Value = "H = H1 + H3"
Ws_calc.Cells(31, "Q").Value = "= U25"
Ws_calc.Cells(31, "R").Value = "= U20 + U22"
'under tools —> references, make sure solver.xla is checked
Solverreset
SolverOptions precison:=0.001
SolverOK setcell:=Range("Q23"), _
    maxminval:=3, _
    valueof:=90, _
    bychange:=Range("U20:U25")
Solveradd cellref:=Range("R21"), _
    relation:=2, _
    formulatext:=Range("Q21")
Solveradd cellref:=Range("R25"), _
    relation:=2, _
    formulatext:=Range("Q25")
Solveradd cellref:=Range("R27"), _
    relation:=2, _
    formulatext:=Range("Q27")
Solveradd cellref:=Range("R29"), _
    relation:=2, _
    formulatext:=Range("Q29")
Solveradd cellref:=Range("R31"), _
    relation:=2, _
    formulatext:=Range("Q31")
Solveradd cellref:=Range("U20:U25"), _
    relation:=3, _
    formulatext:=0
Solversolve 'userFinish:=True
Worksheets("input").Activate
'If marker = 1 Then
'   MsgBox "Please check your inputs. Incompatibilities highlighted in red or error number given."
'Else
    'Display message, title, and default value.
    fileSaveName = Application.GetSaveAsFilename( _
        fileFilter:="Text Files(*.inp), *.inp")
    If fileSaveName <> False Then
        save_it = MsgBox("Save as " & fileSaveName, vbOKCancel, "save")
        If save_it = vbOK Then
            Worksheets("deflector").Activate
            ActivateSheet.SaveAs filename:=fileSaveName, FileFormat:=xlTextPrinter
            outSheetNew = ActiveSheet.Name
            Sheets(outSheetNew).Select
            Sheets(outSheetNew).Name = "deflector"
            Application.DisplayAlerts = False
            ActiveWorkbook.SaveAs filename:=fileOrigName, FileFormat:=xlNormal
            Application.DisplayAlerts = True
        End If
    End If
'End If
    Worksheets("input").Activate
End Sub
```

What is claimed is:

1. A process for manufacturing components of gas turbine engine combustors, comprising the steps of performing a plurality of forming steps on a workpiece of a designated material to produce a component of desired size and shape without exceeding a forming limit of said designated material, said forming steps being performed without any heat treatment on said workpiece therebetween, said forming steps further comprising the steps of:

(a) providing a finite element analysis mode of said workpiece for representing deformation and thinning of said workpiece during said forming steps;

(b) establishing a sequence of said forming steps for said process based at least in part on step (a).

2. The process of claim 1, wherein said finite element analysis mode is a two-dimensional model.

3. The process of claim 1 further comprising the step of comparing membrane strains of said workpiece with a Forming Limit Diagram of said designated material prior to performing step (b).

4. A process for manufacturing components of gas turbine engine combustors, comprising the steps of performing a plurality of forming steps on a workpiece of a designated material to produce a component of desired size and shape without exceeding a forming limit of said designated material, said forming steps being performed without any heat treatment on said workpiece therebetween, said forming steps further comprising the step of sintering a braze material to said workpiece.

5. The process of claim 4, wherein said workpiece has a grain size within a range of approximately ASTM 7.5–9.5 after said sintering process.

6. The process of claim 4, wherein the temperature of said workpiece during said forming steps does not exceed that experienced during said sintering step.

7. A process for manufacturing components of gas turbine engine combustors, comprising the steps of performing a plurality of forming steps on a workpiece of a designated material to produce a component of desired size and shape without exceeding a forming limit of said designated material, said forming steps being performed without any heat treatment on said workpiece therebetween, said forming steps further comprising the step of forming an initially flat blank into a workpiece having an axisymmetric shape of desired size, said workpiece including a substantially cylindrical central portion beting punched therein, a substantially flat flange portion encircling said central portion, and a transition region between said central and flange portions having a first radius.

8. The process of claim 7, further comprising the step of machining a plurality of cooling holes around said transition region of said workpiece.

9. The process of claim 7, said forming steps further comprising the step of forming said workpiece in accordance with a die into an intermediate shape, wherein a diameter of said central portion is widened, said flange portion is angled away from said central portion, and said transition region is shortened so as to have a second radius.

10. The process of claim 9, said forming steps further comprising the step of piercing an end of said central portion, wherein a substantially ring-shaped annular wall provides an opening of predetermined diameter through said workpiece.

11. The process of claim 10, said forming steps further comprising the step of trimming said annular wall adjacent said opening.

12. The process of claim 11, further comprising the step of performing a final forming operation on said workpiece, wherein said workpiece is modified by increasing said diameter of said annular wall, straightening said annular wall adjacent said transition region, and altering said second radius of said transition region to conform with the shape of a model deflector plate.

13. The process of claim 12, further comprising the step of trimming a portion of said annular wall adjacent said opening so as to meet dimensional requirements for said deflector plate.

14. The process of claim 13, further comprising the step of trimming said flange portion to a final outline for said workpiece.

15. A process for manufacturing a deflector plate for gas turbine engine combustors, comprising the steps of performing a plurality of forming steps on a workpiece of a designated material to produce a deflector plate of desired size and shape without exceeding a forming limit of said designated material, said forming steps being performed without any heat treatment on said workpiece therebetween.

* * * * *